United States Patent
Tissmer et al.

(10) Patent No.: US 11,833,732 B2
(45) Date of Patent: Dec. 5, 2023

(54) BLOW MOULD FOR FORMING PLASTIC PREFORMS INTO PLASTIC CONTAINERS WITH AIR DISCHARGE AS WELL AS BASE PART FOR A BLOW MOULD

(71) Applicant: KRONES AG, Neutraubling (DE)

(72) Inventors: Bastian Tissmer, Regensburg (DE); Peter Knapp, Schmatzhausen (DE)

(73) Assignee: KRONES AG

( * ) Notice: Subject to any disclaimer, the term of this patent is extended or adjusted under 35 U.S.C. 154(b) by 0 days.

(21) Appl. No.: 17/707,747

(22) Filed: Mar. 29, 2022

(65) Prior Publication Data
US 2023/0191687 A1 Jun. 22, 2023

(30) Foreign Application Priority Data

Dec. 21, 2021 (DE) ...................... 10 2021 134 057.8

(51) Int. Cl.
*B29C 49/62* (2006.01)
*B29C 49/48* (2006.01)
*B29L 31/00* (2006.01)

(52) U.S. Cl.
CPC .......... *B29C 49/62* (2013.01); *B29C 49/4802* (2013.01); *B29C 2049/6271* (2022.05); *B29L 2031/7158* (2013.01)

(58) Field of Classification Search
CPC .................. B29C 49/62; B29C 49/622; B29C 2049/6271; B29C 2049/627
See application file for complete search history.

(56) References Cited

U.S. PATENT DOCUMENTS

2009/0263534 A1* 10/2009 Lesueur .................. B29C 49/48
425/522
2015/0061196 A1* 3/2015 Dachs ..................... B29C 49/62
425/522

(Continued)

FOREIGN PATENT DOCUMENTS

| DE | 10 2013 226 906 | 7/2015 | |
| DE | 102013226906 A1 * | 7/2015 | ............. B29C 49/62 |
| EP | 3261816 | 1/2019 | |

OTHER PUBLICATIONS

German Search Report issued in German Patent Appln. Serial No. 10 2021 134 057.8, dated Jul. 5, 2022, with English translation, 8 pages.

(Continued)

*Primary Examiner* — Kelly M Gambetta
*Assistant Examiner* — Virak Nguon
(74) *Attorney, Agent, or Firm* — HAYES SOLOWAY P.C.

(57) ABSTRACT

A blow mould for forming plastic preforms into plastic containers, having at least two blow to mould side parts and a base part, which form a cavity, within which plastic preforms can be formed into the plastic containers by being acted upon by a flowable medium, wherein an inner wall of the blow mould side parts and of the base part having a contour which produces a predetermined shape of the plastic containers to be produced, wherein a plurality of openings being provided in at least one section of the base part, which openings allow a gaseous medium to be discharged during an expansion process of the plastic container. A ratio between a surface area of the base part and a surface area of the openings is 3-350, preferably 4-200, and particularly preferably 3-100.

19 Claims, 13 Drawing Sheets

(56) References Cited

U.S. PATENT DOCUMENTS

2016/0325483 A1 11/2016 Langlois et al. ........ B29C 49/48
2016/0332356 A1 11/2016 Langlois et al. ........ B29C 49/48
2017/0173845 A1* 6/2017 Pierre .................... B29C 49/48
2018/0043605 A1* 2/2018 Bischer .................. B29C 49/62
2021/0252766 A1* 8/2021 Geltinger ............... B29C 49/54

OTHER PUBLICATIONS

European Search Report issued in European Patent Appln. Serial No. 22165267.0, dated Sep. 7, 2022, with English translation, 10 pages.

* cited by examiner

BLOW MOULD FOR FORMING PLASTIC PREFORMS INTO PLASTIC CONTAINERS WITH AIR DISCHARGE AS WELL AS BASE PART FOR A BLOW MOULD

BACKGROUND OF THE INVENTION

The present invention relates to a blow mould for forming plastic preforms into plastic containers with air discharge and to a base part for a blow mould. In this process, heated plastic preforms are usually introduced into a blow mould, which forms a cavity that serves to expand the plastic preforms into the plastic containers. Inside this cavity, the plastic preforms are usually pressurised with a flowable medium, such as in particular compressed air or the product to be filled, against an inner wall of these blow-moulded parts and thus formed into the plastic containers. This inner wall has the contour of the plastic container to be produced.

The final blowing pressure, i.e. the pressure with which the plastic preform is completely formed, is essential for the energy requirement of the blow moulding process, so that it should be as low as possible. Decisive for the level of the final blowing pressure is in particular the shape of the last corners of the container, especially in the feet or the standing area, in which counterpressure collects between the plastic preform and the inside of the blow mould, the container contour, which also includes the bottom cup or bottom mould with the contour of the container bottom.

In order to relieve this counterpressure, the base part of the blow mould has ventilation openings. The counterpressure is relieved in particular by the mould parting gaps of the two side parts of the blow mould, the mould parting gap between the two side parts and the bottom part, as well as the venting openings in the bottom part. When the plastic preform has been inflated or formed to such an extent that the developing bubble of the plastic preform is located in the base part, the venting in the base part can only take place via the venting openings.

If there is no or only insufficient venting here, the final blowing pressure must be correspondingly high. The openings in the base part therefore limit the outflowing volume flow in such a way that, especially with comparatively large base part diameters, a correspondingly higher final blowing pressure is necessary, since all base parts have the same number and size of openings, independently of their diameter or area.

In an internal investigation by the applicant of the reduction of the final blowing pressure when stretch blowing plastic containers at different volumes, it was found that the blowing pressure can be reduced more easily with the smaller containers than with the larger ones. It was also found that the "vent hole pattern" remains the same regardless of the hole diameters and is only adapted to the geometry of the contour of the (stand) feet. This means that, for example, a multi-foot floor with 5 feet with a bottle diameter of 50 mm up to a bottle diameter of 200 mm, or more, always has the same surface at the vent holes. However, the surface area of the base geometry increases with the diameter and the base height.

Accordingly, it is known from the applicant's internal prior art that in the base part of a blow mould, which in particular forms the standing feet of the container, there are a number of holes or bores or slots for venting multi-foot bases (several areas for forming standing feet on the container) or petaloid bases. In the applicant's internal prior art, for example, there are eight holes with 1 mm and two holes with 0.8 mm per foot. Thus, for a base with five feet (petaloid base), there are a total of 40 holes with 1 mm and ten holes with 0.8 mm and thus a total of 50 holes.

It is a disadvantage that the known base parts for multi-foot bases or petaloid bases all have the same number of vent holes, independently of their diameter. Particularly for base parts with a larger diameter, especially diameters of >65 mm, a higher final blowing pressure is necessary or the venting is worse than for base parts with a smaller diameter.

Therefore, the object of the present invention is to improve the venting of the blow mould or ensuring sufficient venting independent of the diameter and thus the size of the base part.

SUMMARY OF THE INVENTION

The invention is therefore directed to a blow mould for forming plastic preforms into plastic containers, having at least two blow mould side parts and a base part, which form a cavity within which plastic preforms can be formed into the plastic containers by the application of a flowable medium, wherein an inner wall of the blow-moulding side parts and of the base part, which inner wall delimits the cavity, has a contour which produces a predetermined shape of the containers to be produced, wherein a plurality of openings is provided in at least one portion of the base part, which openings enable a gaseous medium to be discharged during an expansion process of the container.

According to the invention, a ratio between a surface area of the base part and a surface area of the openings is 3-350, preferably 4-200 and particularly preferably 5-100.

Advantageously, the ratio between a surface area of the base part and a surface area of the openings is 25-180, preferably 35-175 and particularly preferably 47-169. The preferred or advantageous ratio depends in particular on the size of the bottle or the bottle volume and the shape of the openings.

For example, for a bottle volume of 0.5 l, a ratio between a surface of the base part and a surface of the openings, which are preferably holes or bores, of 169 is preferred. Advantageously, in this example, the ratio between a surface area of the base part and a surface area of the openings is 145-180, preferably 150-175 and particularly preferably 155-173.

According to the invention, it is proposed that the ratio between the surfaces of the openings and the base part is always approximately the same, independently of the diameter of the base part, i.e. that with a larger diameter, the surface area occupied by the openings is correspondingly larger. This can be achieved, for example, by several openings or even larger openings compared to a smaller diameter of the base part. In this way, sufficient ventilation can be ensured for any size of blow mould or container.

The surface of the openings is understood to be the area that the openings occupy or have in the form of holes, slots or other arbitrary shapes on the base part.

It was found in the applicant's internal investigations that the relationship between the surface area of the base geometry and the surface area of the openings and in particular vent openings or vent holes has an influence on the venting.

The following table shows the ratios for diameters from 50 mm to 125 mm with a bottle volume of 0.5 l and openings in the form of holes. It can be seen that the ratios, with a constant number and diameter of the holes or openings, become larger and larger as the base diameter increases.

| base diameter mm | hemispherical surface base m² | hole diameter mm | number of holes per feet | hole surface mm² | number of holes per base | hole surface per base m² | ratio hole surface to base surface |
|---|---|---|---|---|---|---|---|
| 60.00 | 0.0039 | 1.00 | 10 | 0.7854 | 50 | 0.000039 | 100 |
| 64.00 | 0.0064 | 1.00 | 10 | 0.7854 | 50 | 0.000039 | 163.84 |
| 65.00 | 0.0066 | 1.00 | 10 | 0.7854 | 50 | 0.000039 | 169 |
| 66.00 | 0.0068 | 1.00 | 10 | 0.7854 | 50 | 0.000039 | 174.24 |
| 67.00 | 0.0071 | 1.00 | 10 | 0.7854 | 50 | 0.000039 | 179.56 |
| 68.00 | 0.0073 | 1.00 | 10 | 0.7854 | 50 | 0.000039 | 184.96 |
| 69.00 | 0.0075 | 1.00 | 10 | 0.7854 | 50 | 0.000039 | 190.44 |
| 70.00 | 0.0077 | 1.00 | 10 | 0.7854 | 50 | 0.000039 | 196 |
| 80.00 | 0.0101 | 1.00 | 10 | 0.7854 | 50 | 0.000039 | 256 |
| 90.00 | 0.0127 | 1.00 | 10 | 0.7854 | 50 | 0.000039 | 324 |
| 100.00 | 0.0157 | 1.00 | 10 | 0.7854 | 50 | 0.000039 | 400 |
| 110.00 | 0.0190 | 1.00 | 10 | 0.7854 | 50 | 0.000039 | 484 |
| 120.00 | 0.0226 | 1.00 | 10 | 0.7854 | 50 | 0.000039 | 576 |
| 125.00 | 0.0245 | 1.00 | 10 | 0.7854 | 50 | 0.000039 | 625 |

In the applicant's internal investigations and tests, it was shown that, based on this example, a plastic container with a diameter of 65 mm achieved very good finished blowing pressure results. Therefore, the ratio between the surface area of the bottom geometry and the surface area of the vent openings for a test container with a diameter of 100 mm was adjusted to the ratio of the container diameter of 65 mm.

To do this, as shown in the table, the ratio must be reduced from 400 to approx. 169, i.e. the surface area of the vent openings must be changed and in particular increased, from 0.000039 m² (39 mm²) to 0.000094 m² (94 mm²).

There are various possibilities to change the area of the vent openings and in particular to enlarge them as in the example described. Preferably, the bore diameter of the openings can be increased or the number of vent openings can be increased. Also the use of a combination of different aperture diameters or a square geometry or a rectangular geometry or combinations of bores with rectangular geometries e.g. slots would preferably be conceivable. Since each foot or standing area of the base part has two flanks, there should preferably always be an even number of vent holes per foot in order to obtain a symmetrical division.

For example, for a base diameter of 50 mm, a bore surface area of 0.000023 m² (23 mm²) is required for a ratio of 169 between a surface area of the base part and a surface area of the openings, and for a base diameter of 125 mm, a bore surface area of 0.000145 m² (145 mm²) is required.

As mentioned, it is known from the applicant's internal prior art that in a base part with five feet, each foot preferably has ten openings.

For a base diameter of 100 mm, with a desired ratio of 169, this means that instead of ten vent openings, for example, 24 vent openings per foot, or a total of 120 openings instead of 50 openings with a diameter of 1 mm, must be provided, or instead of ten vent openings with a diameter of 1 mm, ten vent openings with a diameter of 1.5 mm, or the arrangement of openings with different diameters and therefore instead of ten vent openings with a diameter of 1 mm, eight vent openings with a diameter of 1 mm and one vent opening with a diameter of 4 mm.

The holes or openings should preferably be designed in such a way that they are on the one hand large enough to allow venting or a sufficiently large flow cross-section, but still small enough so that no material of the plastic container is pressed into the openings during forming and also no visible and/or noticeable areas form on the finished plastic container.

Preferably, the openings open into channels which extend through the wall of the blow mould and the base part, so that the flowable medium is preferably discharged from the blow mould via the channels. Accordingly, channels which serve to discharge the gaseous medium preferably adjoin the openings within a wall of the blow mould parts and in particular of the base part. Advantageously, these channels extend at least partially through the wall of the base part. Preferably, the channels establish a flow connection between an outer wall of the base part and an inner wall of the base part and thus preferably also between an inner space of the blow mould and an outer space of the blow mould.

In a preferred embodiment, the diameter of the base part is between 50 mm and 200 mm and the surface of the openings is between 23 mm² and 500 mm² and/or the surface of the base part is between 3900 mm² and 65000 mm² and the surface of the openings is between 23 mm² and 500 mm². Advantageous are combinations of diameter of the base part, surface of the openings and surface of the base part, which result in a ratio between surface of the openings and surface of the base part of preferably 160-175 and particularly preferably close to 169, since such a ratio ensures the lowest compressed air consumption with the highest possible container quality. This ratio is particularly advantageous for bottle volumes of 0.5 l and the design of the openings as holes.

In a further preferred embodiment, the openings are a plurality of holes and/or slots which are arranged in the base part and in particular in the areas of the base part which serve to form the standing areas of the finished container. A combination of slots and holes is also preferred.

If the openings are designed as slots, for example, a ratio of 169 still provides satisfactory results, but the bottle quality can be further improved advantageously at a ratio of up to 47, so that the ratio between the surface area of the openings and the surface area of the base part, if the openings are designed as slots, is preferably 40-180, preferably 45-170 and particularly preferably 47-169.

If the openings are a combination of slots and holes, the ratio between the surface area of the openings and the surface area of the base part is preferably 30-50, preferably 33-45 and particularly preferably 35-41.

The holes can preferably be arranged in an orderly manner along at least one and preferably at least two imaginary geometric lines. However, a disorderly arrangement of the holes is also conceivable, for example, specifically in areas in which the standing areas of the container can be formed with difficulty, such as very narrow or small areas.

Preferably, a slot can also be formed by an arrangement of a plurality of holes or bores, which are preferably arranged along a row or a spline. A plurality of holes preferably extends along at least one geometric line. Preferably, the holes are arranged along two or more rows next to each other, so that at least two rows of holes extend next to each other along geometric lines. The number of the holes of the vent holes in the base part is again preferably dependent on the required or desired vent hole surface in relation to the surface of the base part.

The holes of the individual rows can preferably be arranged directly next to each other at the same height or offset from each other. The holes preferably have a diameter of 0.2 mm to 7 mm, preferably 0.3 mm to 5 mm and particularly preferably 0.5 mm to 4 mm. The distances between the individual holes in a row are preferably equal or different. Preferably, the spacing is 0.6× to 2.5× the diameter of the holes and particularly preferably 0.5× to 2× the diameter of the holes.

On an outer side of the bottom mould, the openings and in particular the plurality of holes arranged along a row are preferably guided within a channel in order to discharge the gaseous medium from the bottom mould more quickly. The channel preferably has a multiple width in relation to the diameter of the holes.

Preferably, each section of a base part has a specific hole pattern. Preferably, the hole pattern in a foot and/or a section of the base part may consist of an arrangement of several rows and columns. Preferably, the hole pattern is arranged centrally within the section of the base part. Preferably, the holes or vent holes all have the same diameter or different diameters. In the case of different diameters, the diameters are preferably in a ratio of between 0.25 and 10, preferably between 0.4 and 8 and particularly preferably between 0.5 and 6 to each other. Here again, the number of holes of the vent holes in the base part is preferably dependent on the required or desired vent hole surface in relation to the surface of the bottom part.

In a further preferred embodiment, the base part is designed to form standing feet of the plastic container, wherein each standing foot having a plurality of openings. Preferably, three to twelve standing areas are arranged in the base part to form three to twelve standing feet of the plastic container.

The openings are thus preferably arranged in an area of the base part that serves to form standing areas of the container. Preferably, the openings are therefore arranged in curved sections of the base part.

In a preferred embodiment, each standing foot or each area of the base part used to form standing areas of the container has 7-35 openings, preferably 8-30 openings and particularly preferably 10-25 openings. In total, a base part with five standing areas therefore has 35-175 openings, preferably 40-150 openings and particularly preferably 50-125 openings.

In another preferred embodiment, at least one hole has a diameter that is between 0.5 mm and 4 mm, preferably between 0.8 mm and 2 mm. Particularly preferably, in order to avoid the vent openings becoming too pronounced on visible surfaces or functional surfaces on the base, the diameters of the holes should not be larger than 2 mm, and not smaller than 0.8 mm. In other places, the openings can preferably be up to 5 mm in size in order to realise fast venting.

Preferably, a distance between two openings arranged next to each other is less than 4 mm, preferably less than 3 mm and preferably less than 2 mm. In particular, there must be enough material between two adjacent openings and in particular holes or bores so that they do not run into each other or merge into each other. The minimum distance between two holes, from hole edge to hole edge, is preferably 0.2 mm. The distance between two openings and in particular holes arranged next to each other is thus preferably between 0.5 mm and 4 mm, preferably between 0.4 mm and 3 mm and particularly preferably between 0.2 mm and 2 mm.

In a further preferred embodiment, at least one slot has a width of between 0.4 mm and 2 mm, preferably between 0.5 mm and 1 mm, and particularly preferably between 0.6 mm and 0.8 mm. The slots are preferably arranged on the base part by wire erosion, milling, die-sinking or laser cutting. Depending on the width of the cut or slot, a rectangular cross-section can be created.

Preferably, each standing area or each area of the base part, which serves to form standing areas of the plastic container, has between one and four slots.

Preferably, a combination of holes and slots in the base part is also conceivable, wherein the holes are preferably formed at the ends of the slots or the respective slot. This leads to a reduction of the stresses in the slots. A slot therefore preferably runs from hole to hole. Preferably, ten holes and two slots are formed in each standing foot of the base part. Preferably, however, there may be more than ten holes or less than ten holes in a standing to foot.

The present invention is further directed to a base part for a blow mould for forming plastic preforms into plastic containers, wherein the base part having an inner wall with a contour which produces a predetermined base shape of the containers to be produced, wherein in at least one portion of the base part a plurality of openings is provided which allow a gaseous medium to be discharged during an expansion process of the container.

According to the invention, a ratio between a surface area of the base part and a surface area of the openings is 3-350, preferably 4-200 and particularly preferably 5-100.

BRIEF DESCRIPTION OF THE DRAWINGS

Further advantages and embodiments can be seen in the attached drawings.

In the drawings.

DETAILED DESCRIPTION OF THE INVENTION

Figure 1:
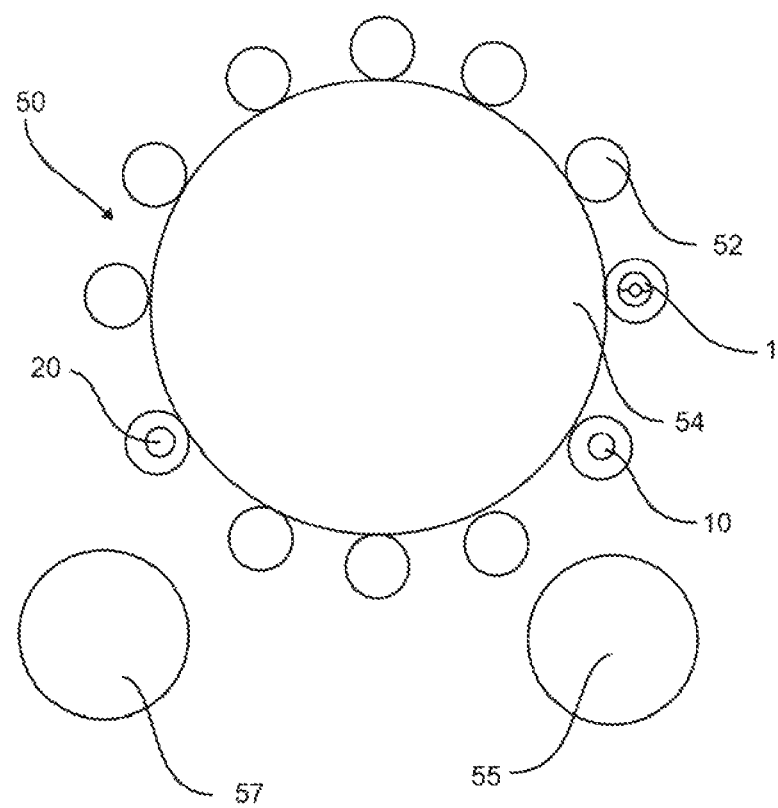
FIG. 1 shows a roughly schematic representation of an apparatus for forming plastic preforms into plastic containers.

FIG. 1 shows a roughly schematic representation of an apparatus according to the invention for forming plastic preforms 10 into plastic containers 20. In this case, the plastic preforms 10 are fed via a feed device 55, such as a feed starwheel, and the finished containers are removed from the forming device 50 via a discharge device, such as a discharge starwheel 57. The forming device 50 has a rotatable carrier 54 on which a plurality of forming stations 52 are arranged. Each of these forming stations 52 has a blow mould 1.

Figure 2:
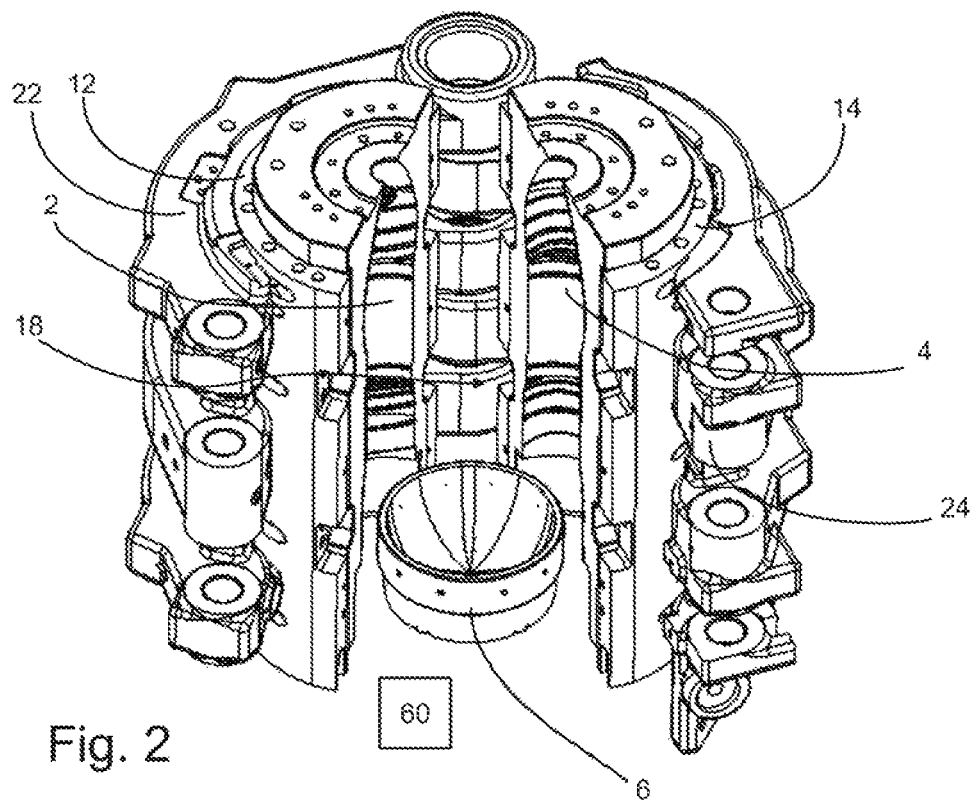
FIG. 2 shows a representation of a blowing station with blow mould for forming plastic preforms into plastic containers.

FIG. 2 shows a schematic view of a blow mould according to the invention. This blow mould has two side parts 2, 4 and a base part 6. Together, these two side parts and the base part 6 form a cavity 18 within which the plastic preforms are expanded to form the plastic containers. The vent openings described above are located in particular in the base part, but they can also be provided in the side parts, for example, in order to be able to better form complicated curvatures of the plastic container. The reference signs 12, 14 refer to support shells which support the side parts 2, 4 and the reference signs 22, 24 refer to blow mould supports to which the side parts are respectively attached (via the support shells 12, 14).

The reference sign 60 refers to a vacuum generation device shown only schematically. This can be controlled in such a way that it extracts air from the interior of the blow mould for a predetermined period of time during the expansion of the plastic preforms.

The following FIGS. 3 to 19 show different designs of base parts. For the sake of clarity, not all reference signs are repeated in the individual figures.

Figure 3:
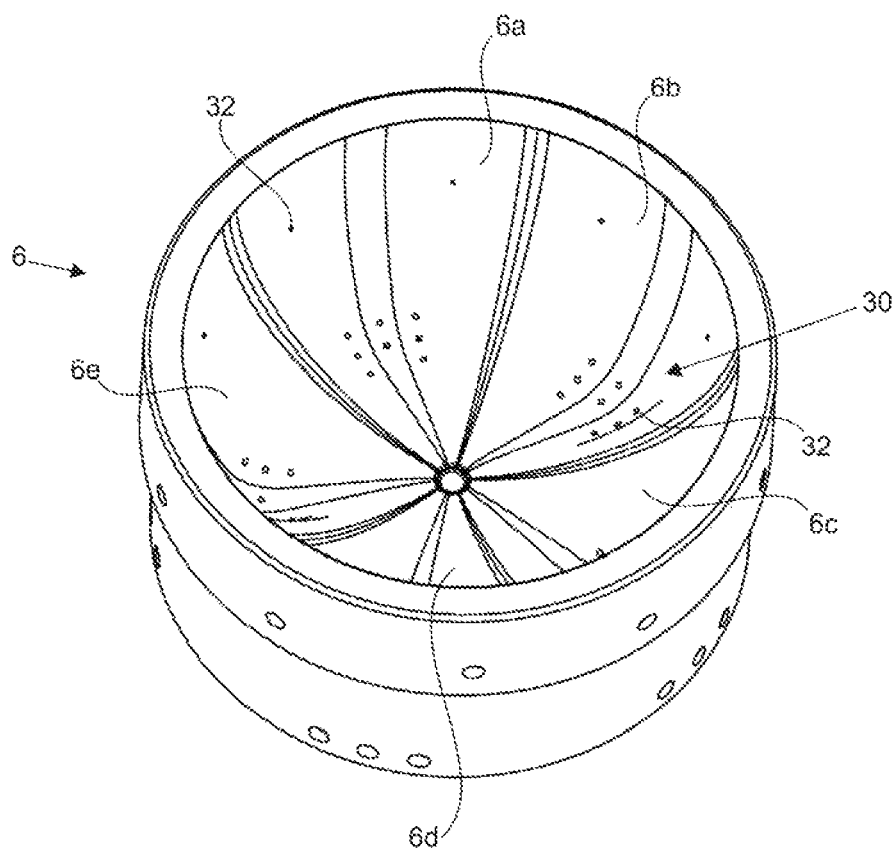
FIG. 3 shows a schematic representation of a base part according to the invention with vent holes.

FIG. 3 shows a schematic representation of a base part 6 according to the invention. In this embodiment, the base part has five sections 6a, 6b, 6c, 6d, 6e, which each form a standing area or are suitable and intended for forming a standing area of the plastic container 20.

A plurality of openings 30, which in this case are holes, are formed in each standing area. In the embodiment example according to FIG. 3, ten holes 32 are arranged in each section 6a, 6b, 6c, 6d, 6e, all of which have the same diameter. In particular, FIG. 3 shows a base part 6 with a bottom diameter of 65 mm with ten holes in each section 6a, 6b, 6c, 6d, 6e, which have a diameter of 1 mm.

Figure 4:
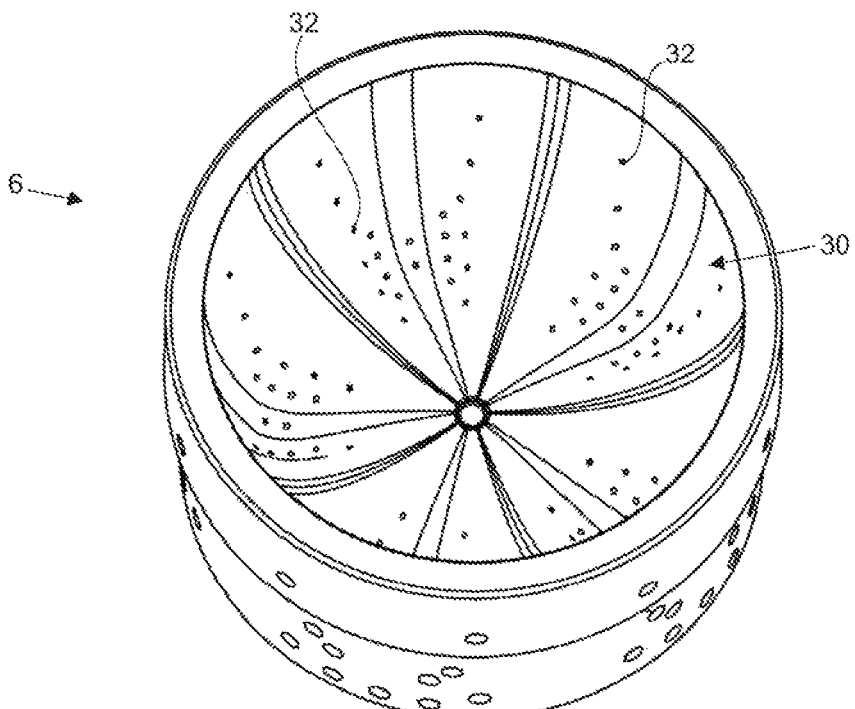
FIG. 4 shows a further schematic representation of a base part according to the invention with vent holes.

FIG. 4 shows a further schematic representation of a base part 6 according to the invention. Here, too, openings 30 are provided in each section, which consist of a plurality of holes 32. In contrast to FIG. 3, here each section has twenty-four holes 32. This indicates that the diameter of the base part 6 of FIG. 4 is either larger than the diameter of the base part of FIG. 3 or the holes here have a smaller diameter than the holes in FIG. 3. In particular, FIG. 4 shows a base part 6 with a bottom diameter of 100 mm with 24 holes 32 in each section 6a, 6b, 6c, 6d, 6e, which have a diameter of 1 mm.

Figure 5:
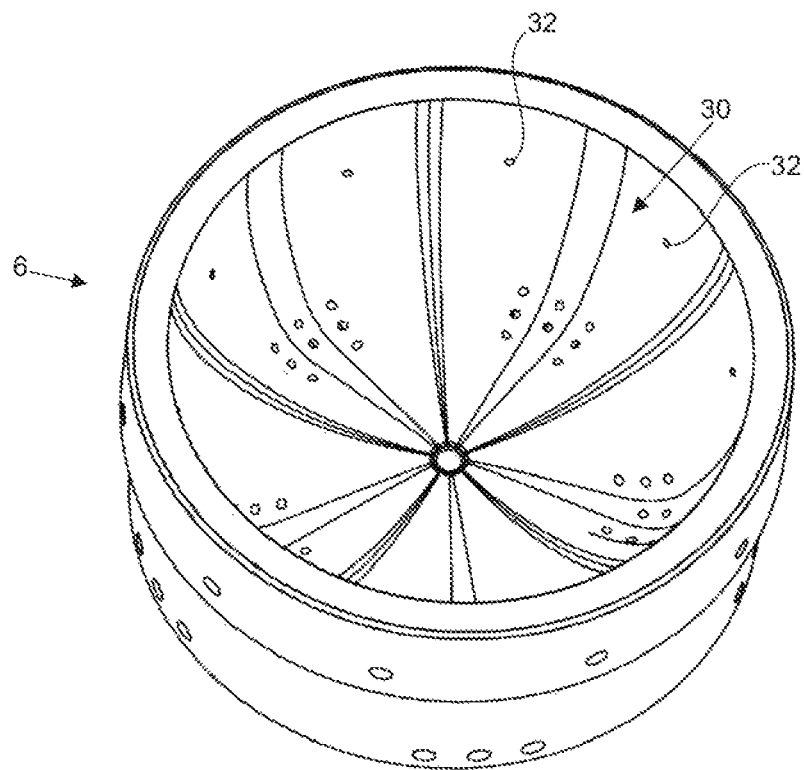
FIG. 5 shows a further schematic representation of a base part according to the invention with vent holes.

FIG. 5 shows a further schematic representation of a base part 6 according to the invention. Here again, ten holes 32 are arranged in each section of the base part 6, but these are of a larger diameter than the holes in the base part of FIG. 3. In particular, FIG. 5 shows a base part 6 with a bottom diameter of 100 mm with ten holes 32 in each section 6a, 6b, 6c, 6d, 6e, which have a diameter of 1.5 mm.

Figure 6:
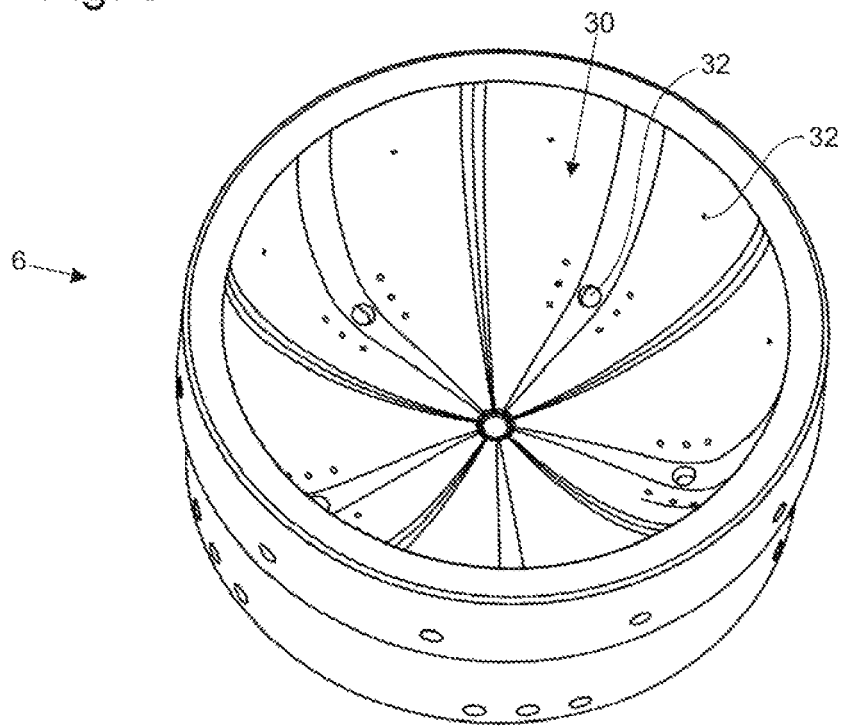
FIG. 6 shows a further schematic representation of a base part according to the invention with vent holes.

In the FIG. 6, nine holes 32 are arranged in each section of the base part 6, which have different diameters. In particular, FIG. 6 shows a base part 6 with a bottom diameter of 100 mm with nine holes 32 in each section 6a, 6b, 6c, 6d, 6e, wherein eight holes having a diameter of 1 mm and one hole having a diameter of 4 mm.

Figure 7:
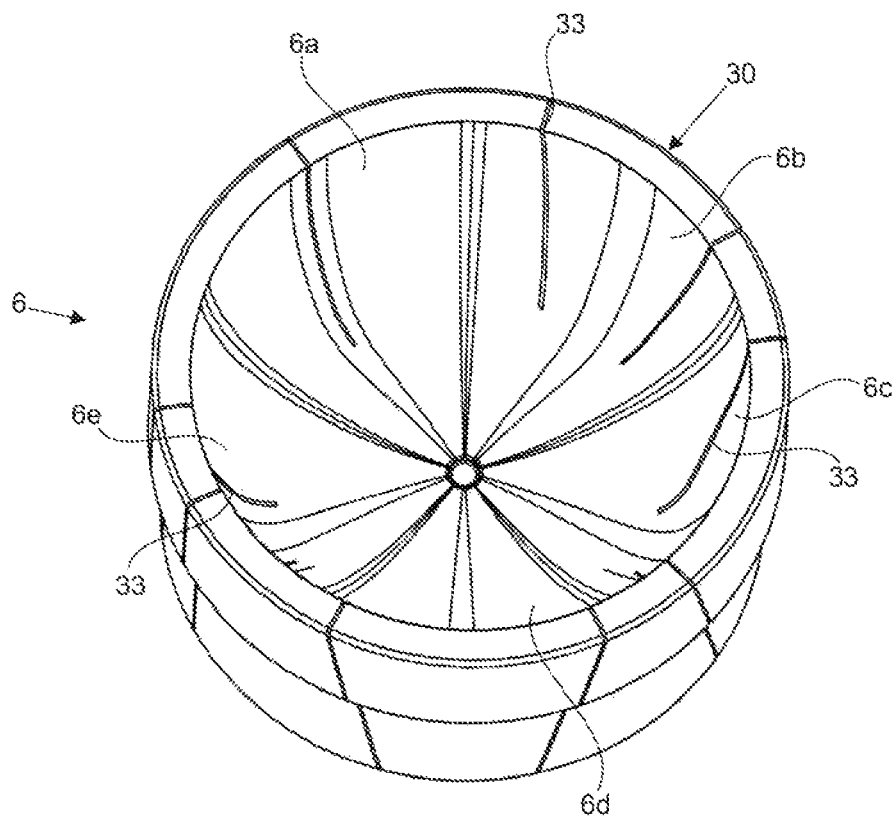
FIG. 7 shows a schematic representation of a base part according to the invention with slots.
Figure 8:
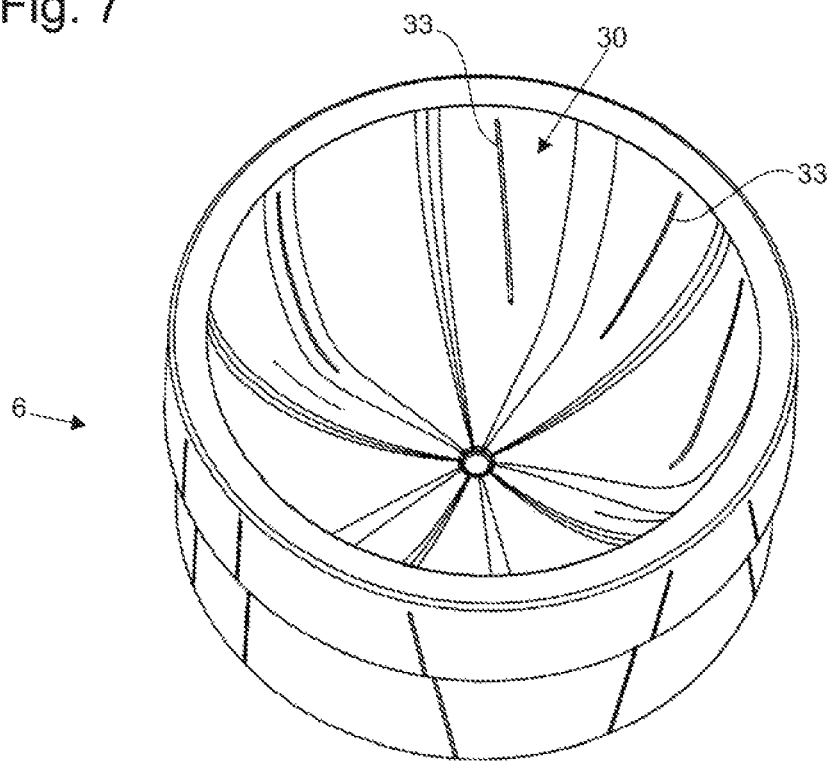
FIG. 8 shows a further schematic representation of a base part according to the invention with slots.
Figure 9:
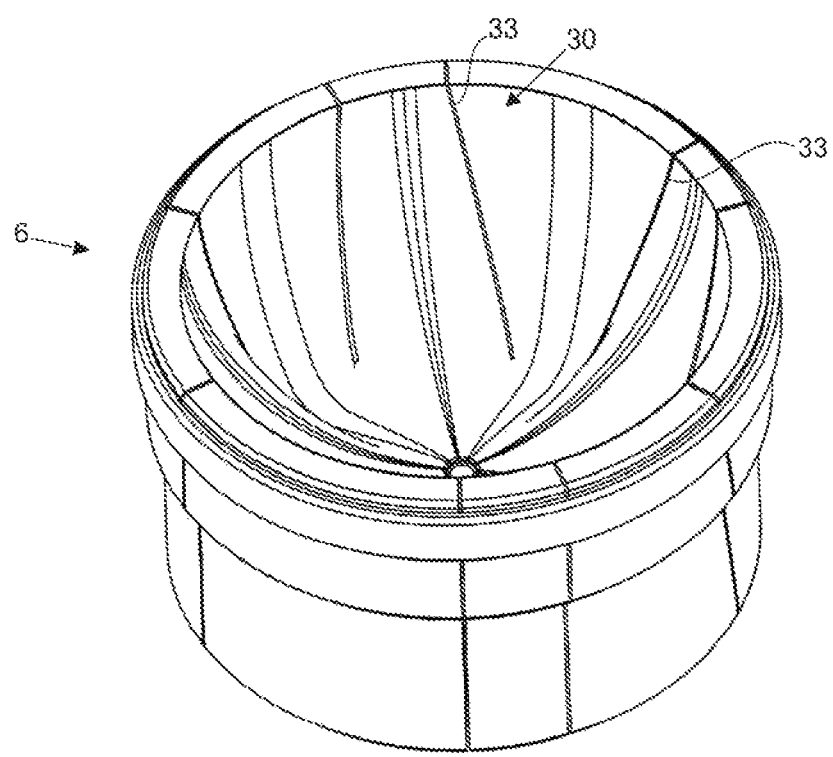
FIG. 9 shows a further schematic representation of a base part according to the invention with slots.

FIGS. 7-9 show further schematic representations of a base part 6 according to the invention. In these embodiments, openings 30 are arranged in each section 6a, 6b, 6c, 6d, 6e of the base part 6, which are here designed as slots 33. In FIG. 9, a ring is additionally arranged on the base part 6 to improve stability. The ring can preferably be arranged on the outer circumference of the base part 6 by shrinking, screwing or welding.

FIGS. 10-13 show a further embodiment of a base part 6 according to the invention, wherein the openings 30 here comprise a combination of holes 32 or bores and slots 33. It can be seen that holes 32 are arranged at the ends of the slots 33 in each case, wherein the slots 33 preferably extending from hole 32 to hole 32. In this embodiment, ten holes 32 and two slots 33 are thereby arranged in each section 6a, 6b, 6c, 6d and 6e of the base part 6.

Figure 10:
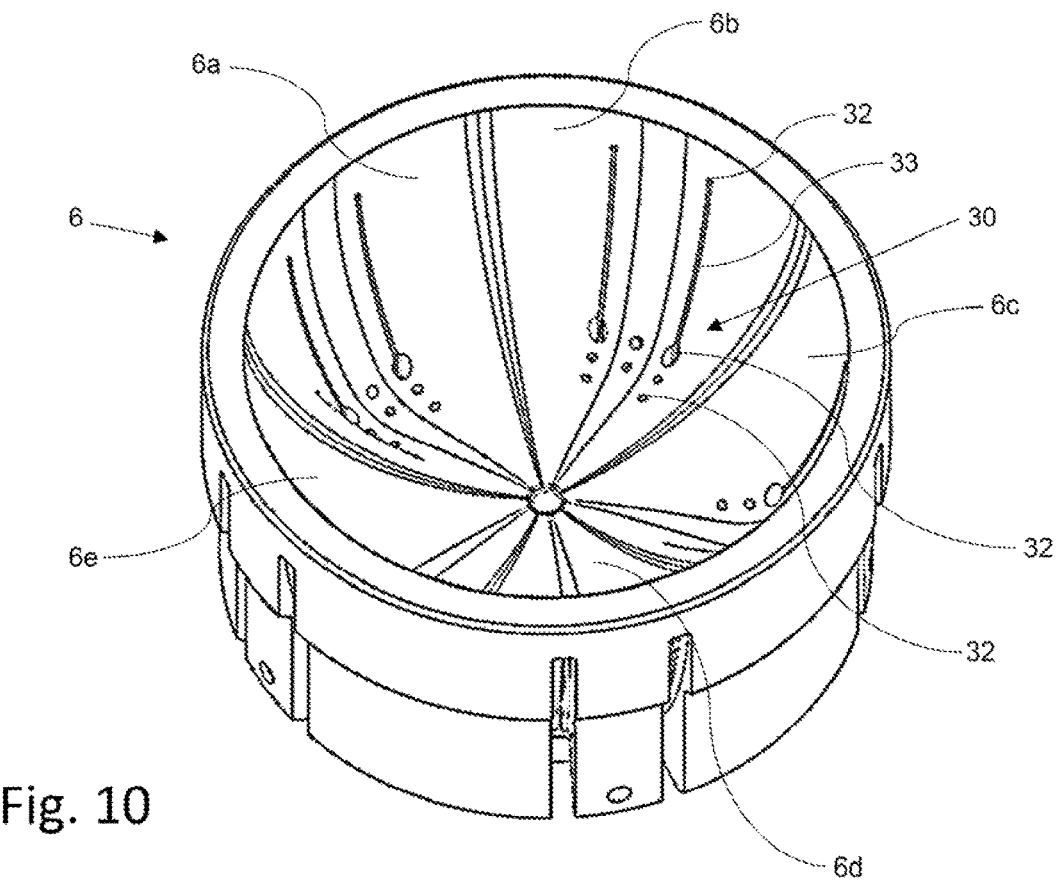
FIG. 10 shows a schematic representation of a base part according to the invention with a combination of vent holes and slots.
Figure 14:
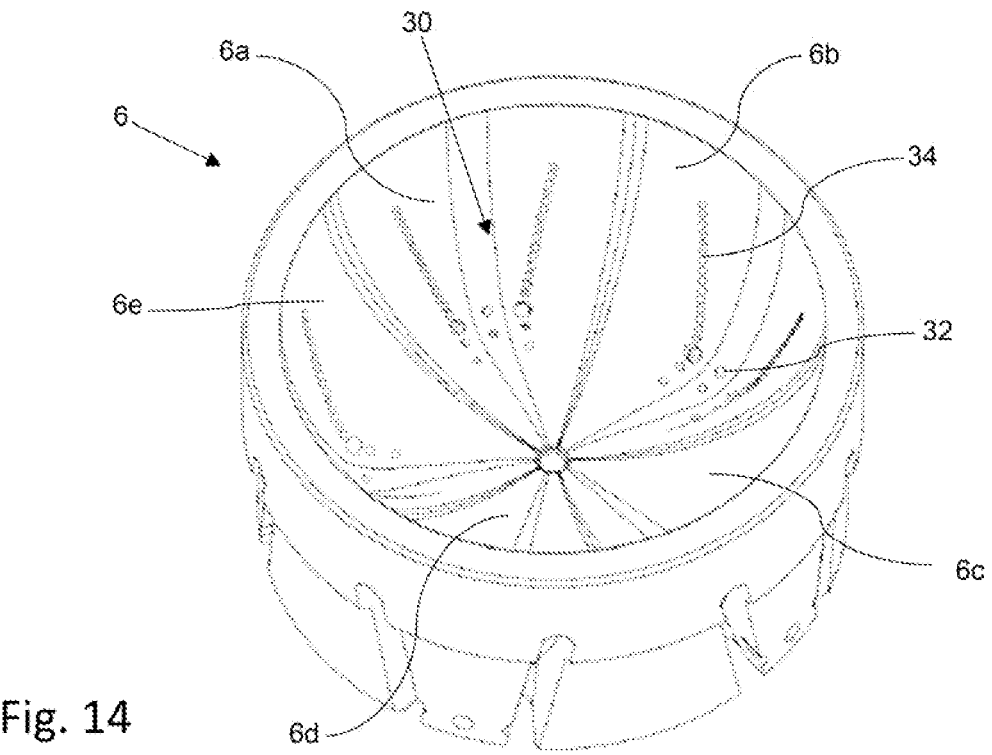
FIG. 14 shows a further schematic representation of a base part according to the invention.

FIG. 14 shows another schematic representation of a base part 6 according to the invention. In this embodiment, a plurality of holes are arranged along a row 34, thus forming a kind of slot. In addition to these holes arranged in row 34, the base part may also have further holes 32. In particular, the arrangement of the openings 30 in FIG. 14 corresponds to the arrangement of the openings 30 in FIG. 10, except that the openings formed as slots in FIG. 10 are formed by a plurality of holes arranged along a row 34 in FIG. 14. The reference signs 6a-6e again indicate the individual sections of the base part 6.

Figure 15:
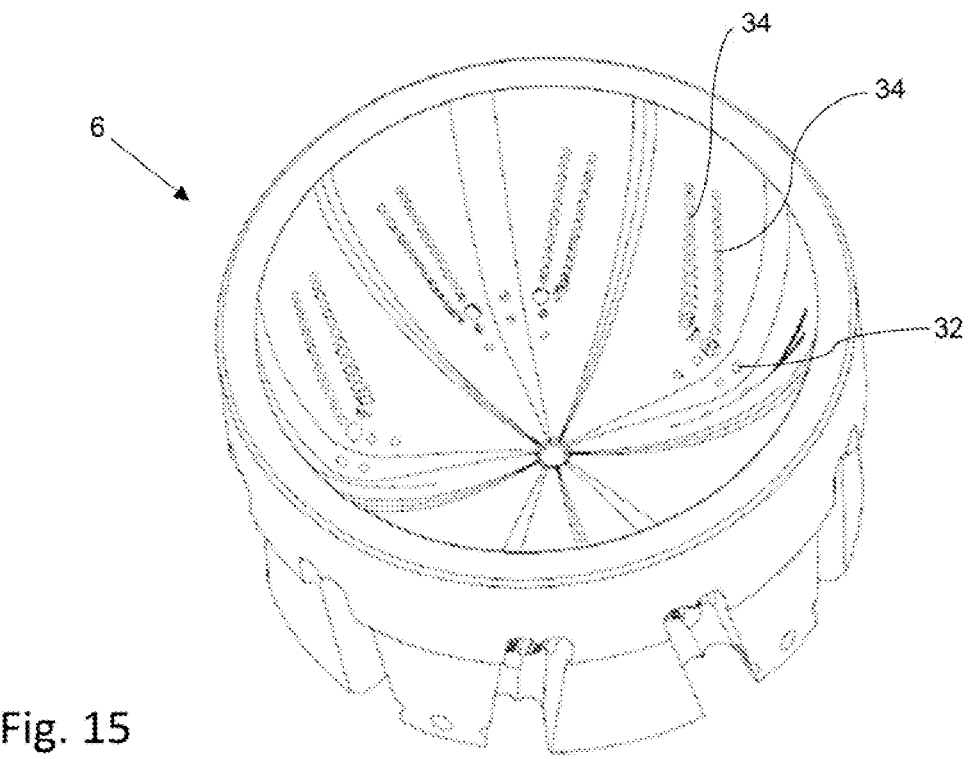
FIG. 15 shows a further schematic representation of a base part according to the invention.

FIG. 15 shows a further schematic representation of a base part 6 according to the invention. FIG. 15 shows an embodiment in which two rows 34, each with a plurality of holes, are arranged parallel to each other. The arrangement of several such rows would also be conceivable.

Figure 16:
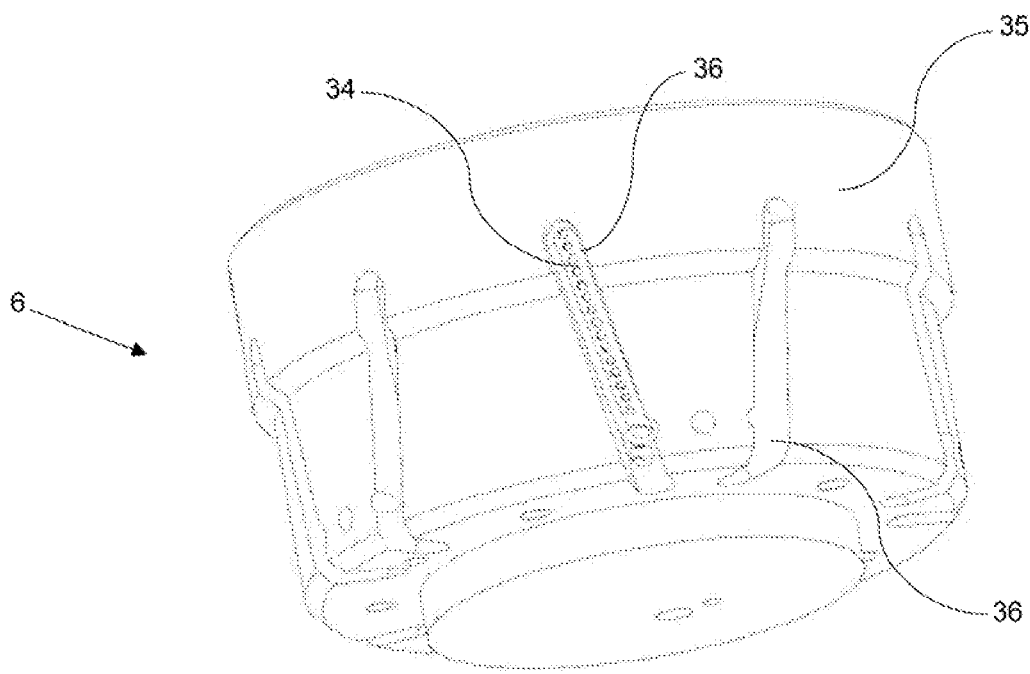
FIG. 16 shows an external view of the base part shown in FIG. 14.

FIG. 16 is an external view of the base part 6 shown in FIG. 14. It can be seen that a channel 36 is formed on the outer surface 35 of the base part 6 in the area of each row 34. This channel allows the gaseous medium to be discharged from the base part more quickly. The channel 36 has a multiple width in relation to the diameter of the holes arranged in the row 34.

Figure 17:
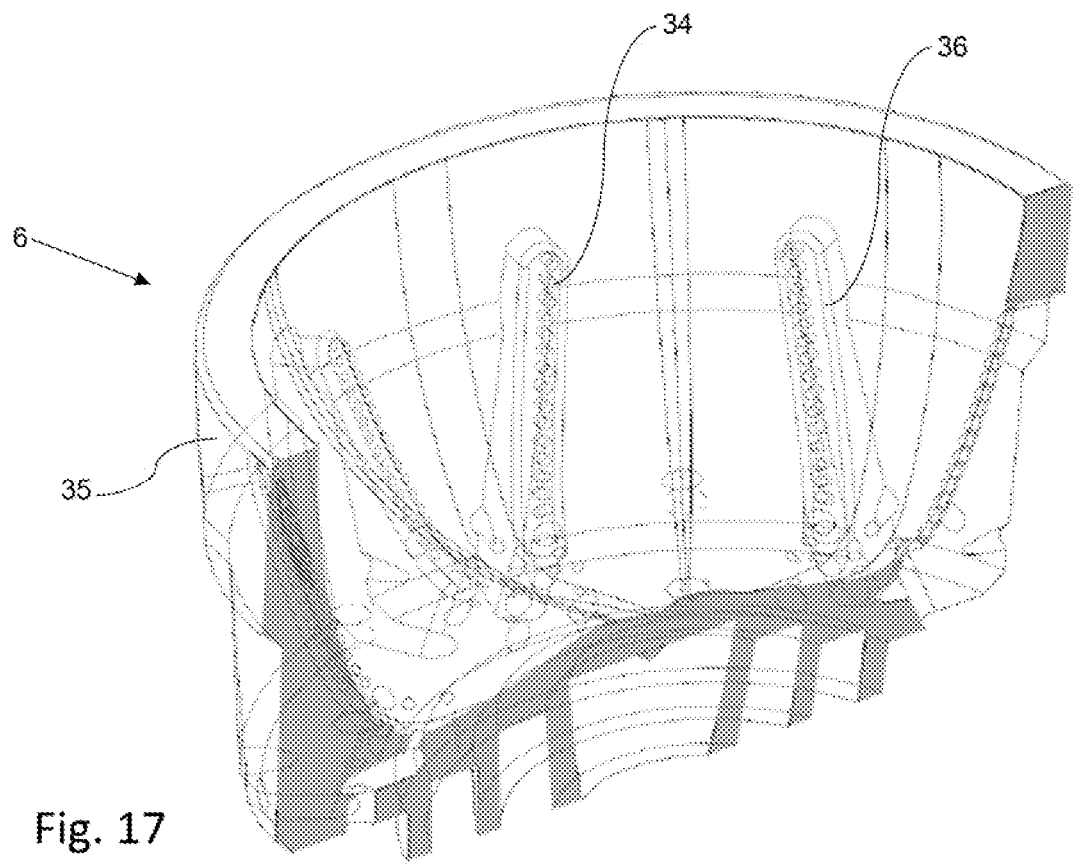
FIG. 17 shows a sectional view of the base part shown in FIG. 14.

FIG. 17 shows a sectional view of the base part 6 shown in FIG. 14. In this view, in particular, the plurality of holes arranged in a row 34 can again be seen, as well as the channels 36 arranged on the outer surface 35 of the base part 6, in the area of the rows 34.

Figure 11:
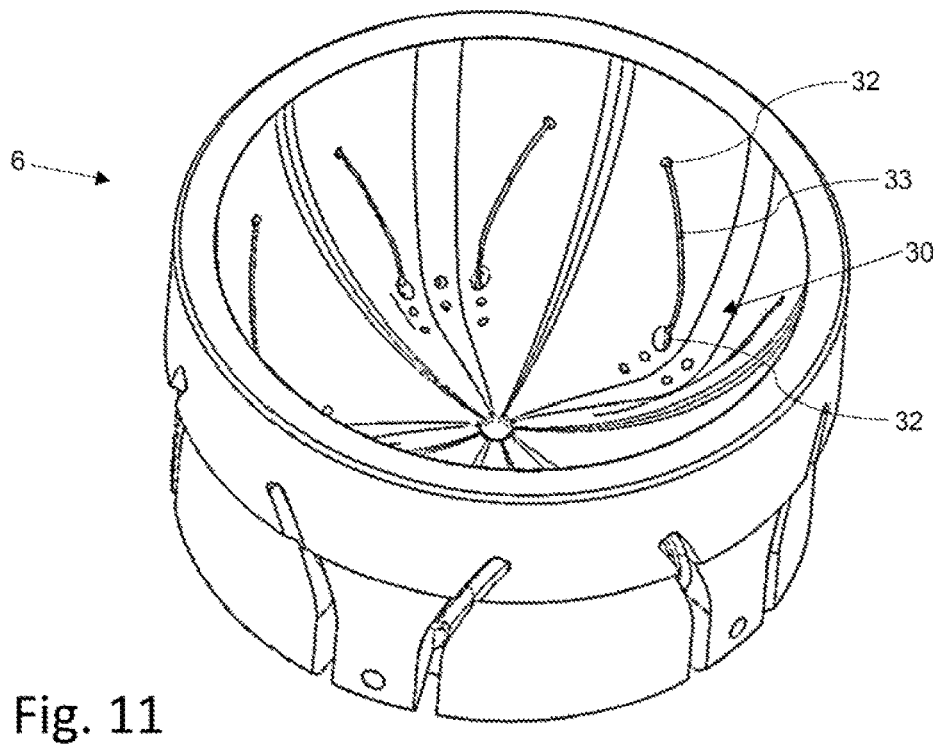
FIG. 11 shows a further schematic representation of a base part according to the invention with a combination of vent holes and slots.
Figure 12:
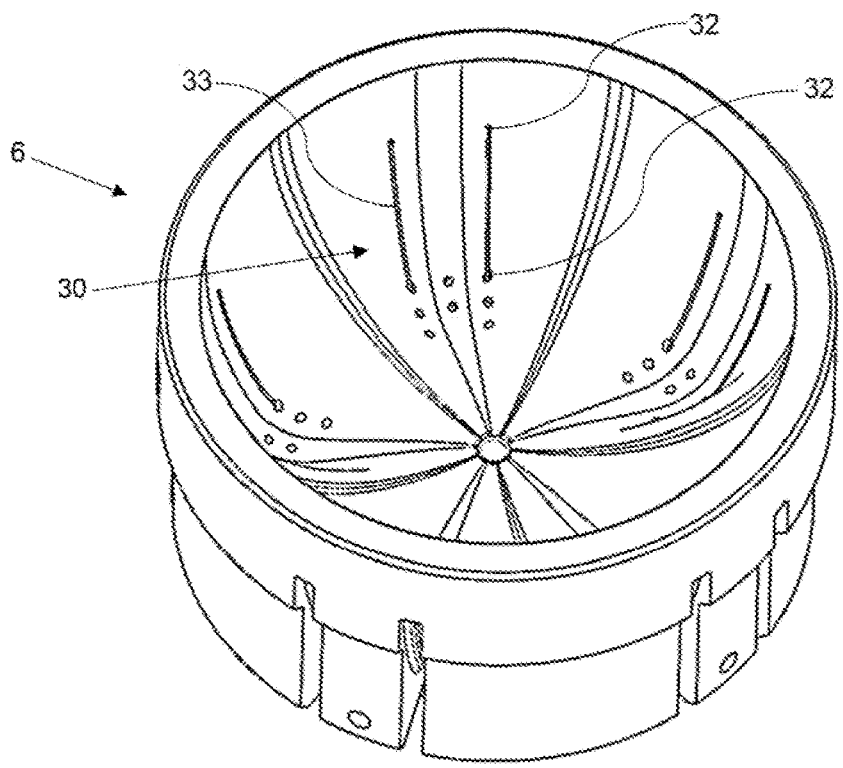
FIG. 12 shows a further schematic representation of a base part according to the invention with a combination of vent holes and slots.
Figure 13:
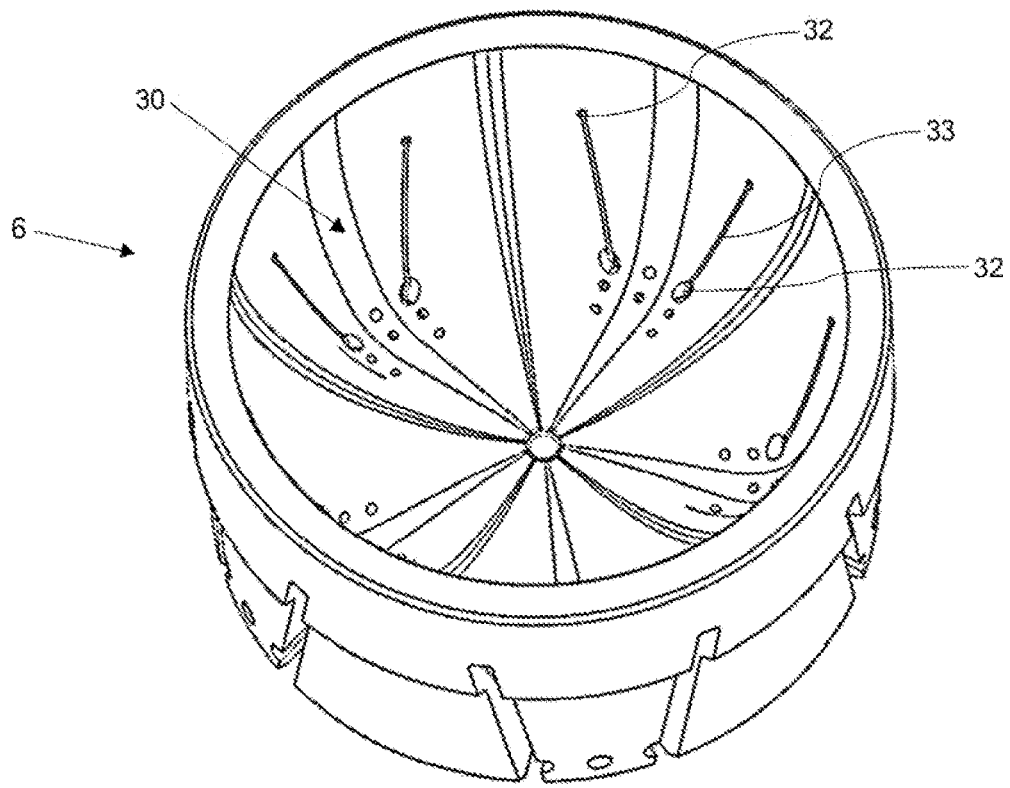
FIG. 13 shows a further schematic representation of a base part according to the invention with a combination of vent holes and slots.
Figure 18:
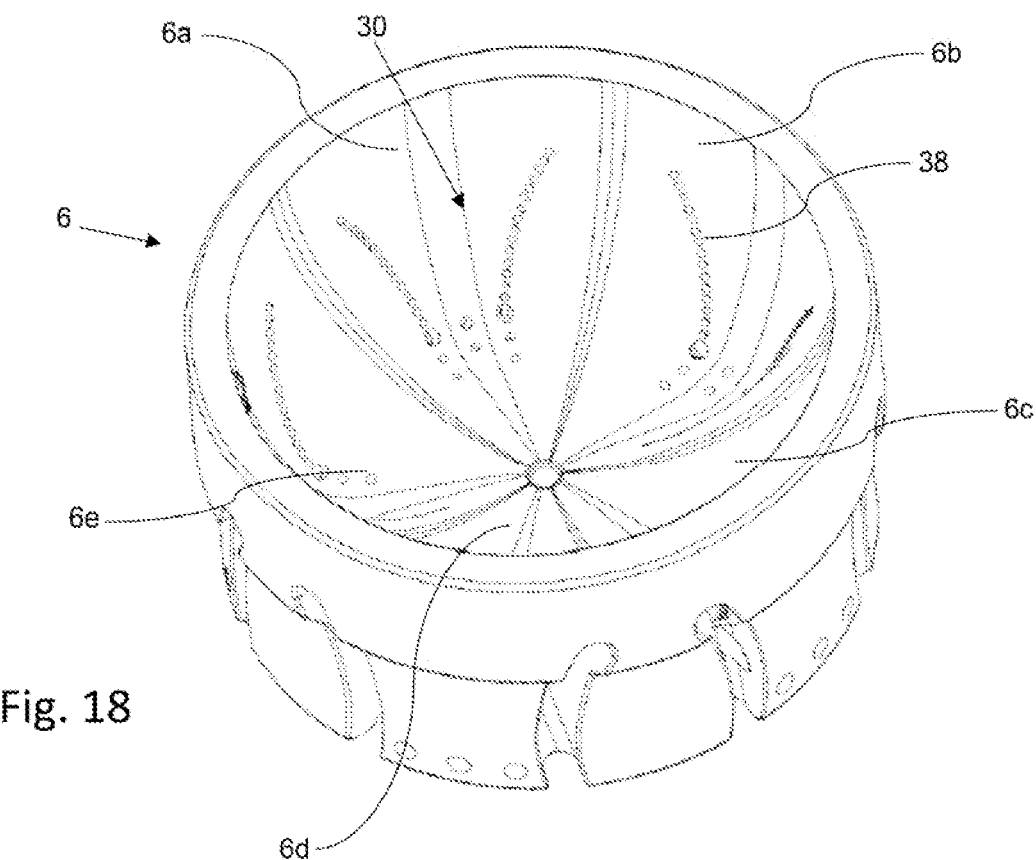
FIG. 18 shows a further schematic representation of a base part according to the invention.

FIG. 18 shows a further schematic representation of a base part 6 according to the invention. In this embodiment, a plurality of holes is arranged along a spline 38. This arrangement of the openings 30 corresponds to the arrangement of the openings 30 in FIG. 11, with the difference that the openings formed as curved slots in FIG. 11 are formed by a plurality of holes arranged along a spline 38 in FIG. 18.

Figure 19:
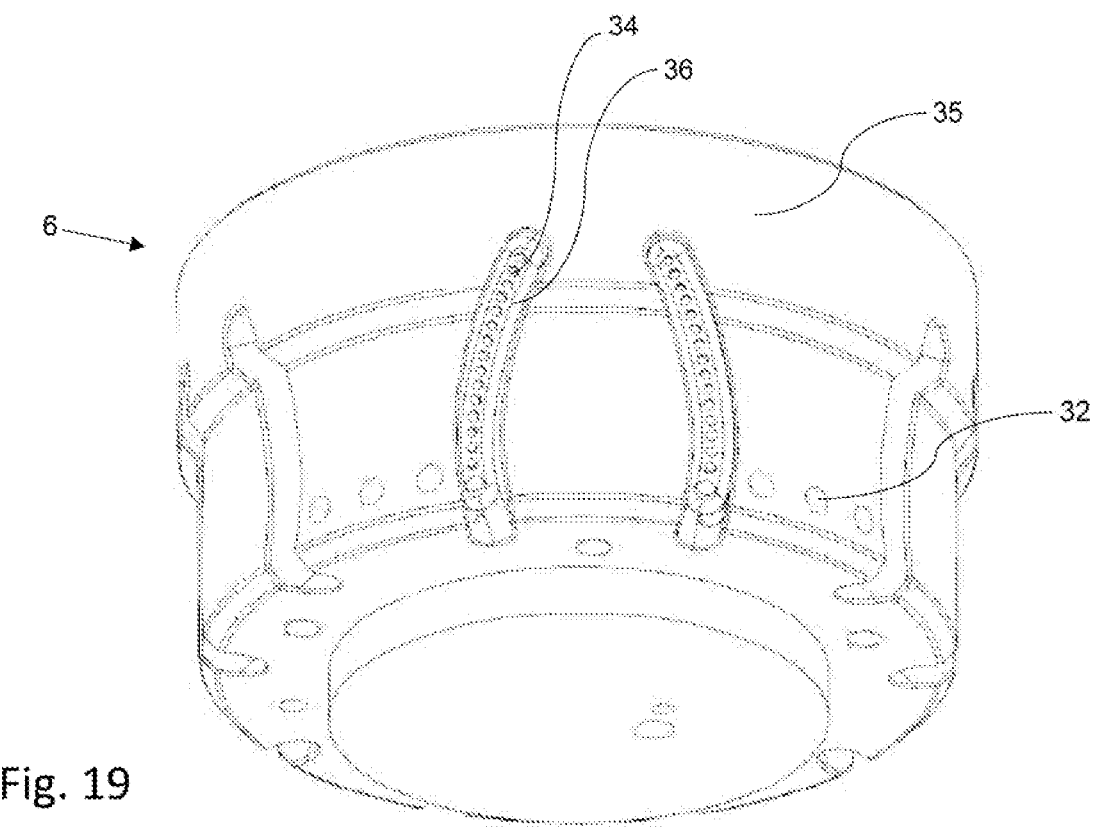
FIG. 19 shows an external view of the base part shown in FIG. 18.

FIG. 19 is an external view of the base part 6 shown in FIG. 18. On the outer surface 35 of the base part 6, the channel 36 can be seen here again, which corresponds in shape to the spline 38 formed by the holes.

Figure 20:
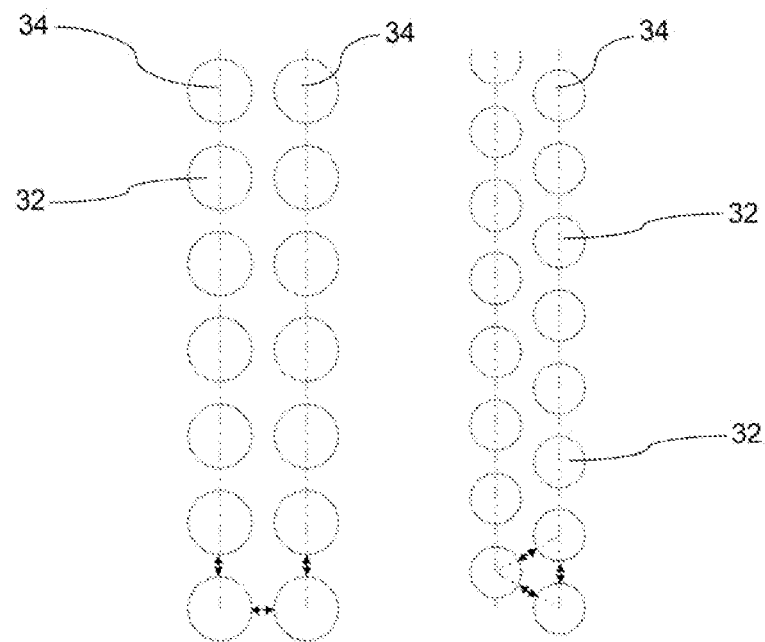
FIG. 20 shows a schematic representation of an arrangement of holes in series.

FIG. 20 shows a schematic representation of an arrangement of holes 32 in row 34. In the left-hand illustration, two rows 34 of holes 32 are visible, wherein the holes 32 are arranged at the same height and directly next to each other. In the right-hand illustration, two rows 34 of holes 32 are also visible, wherein the holes 32 are here arranged offset from each other. The small arrows indicate the distances between the holes, which can be the same or different.

Figure 21:
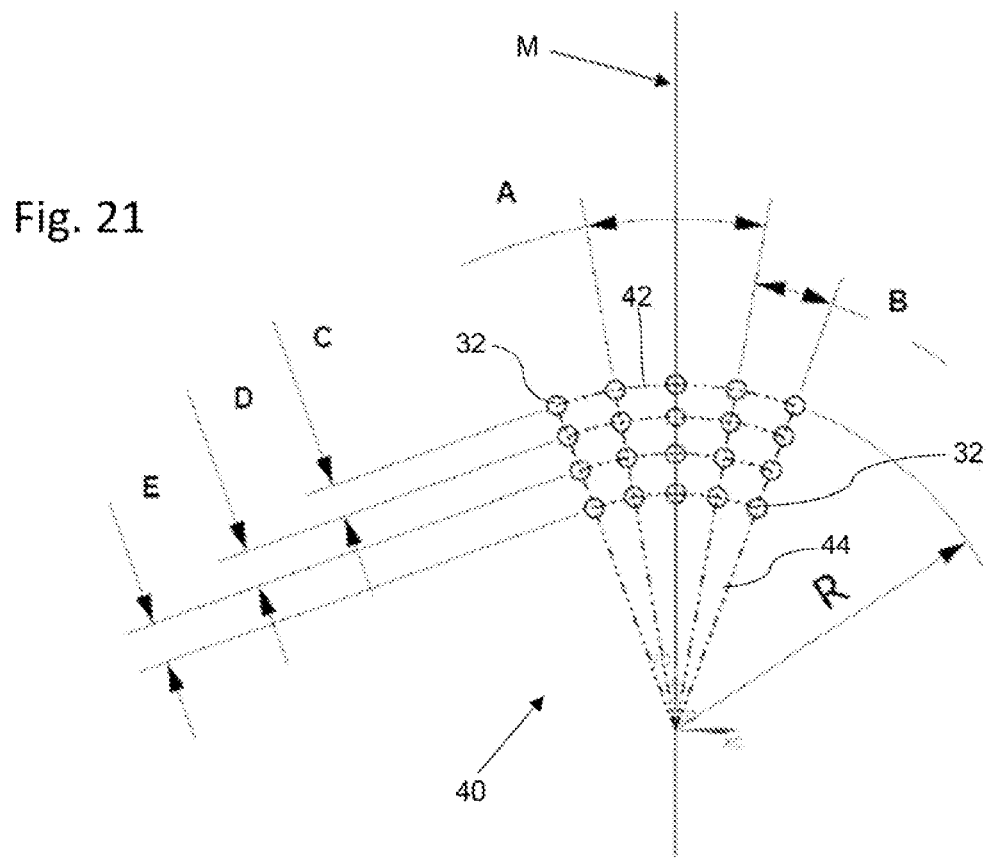
FIG. 21 shows an exemplary hole pattern of a section of the base part.

FIG. 21 shows an exemplary hole pattern 40 of a section of the base part. The hole pattern is perpendicular to a surface of the base geometry of the base and is preferably arranged centrally on the standing foot of the base part with respect to a centre point M of the base part. The individual holes 32 are arranged here in particular in several columns 44 and rows 42. The angles A and B depend on the width of the standing foot. The angle A, which extends from the centre point M to the respective adjacent column, is preferably between 2° and 60°, preferably between 5° and 35° and particularly preferably between 10° and 25°. The angle B between two adjacent columns is preferably between 0.5° and 30°, preferably between 0.8° and 25° and particularly preferably between 1° and 20°. Preferably, the angle A can also be dependent on the diameter of the container or be in a ratio X to the container diameter. The ratio X can preferably be between 0 and 10.

The reference sign R indicates the radius of the base part and the reference signs C-E indicate the distances between the holes along a row or column 44. The radius R is preferably either in a ratio RD to the container diameter or in a ratio RS to a standing circle diameter of the bottom. The ratio RD can range between 0 and 1, preferably between 0.25 and 0.90. The ratio RS can range between 0 and 2, preferably between 0.5 and 1.5.

The distances C, D and E are preferably in a ratio RA to the radius R. The distances C, D and E preferably all have the same ratio to the radius R. However, it is conceivable that the dimensions C, D and E are in different ratios to the radius R.

Figure 22:
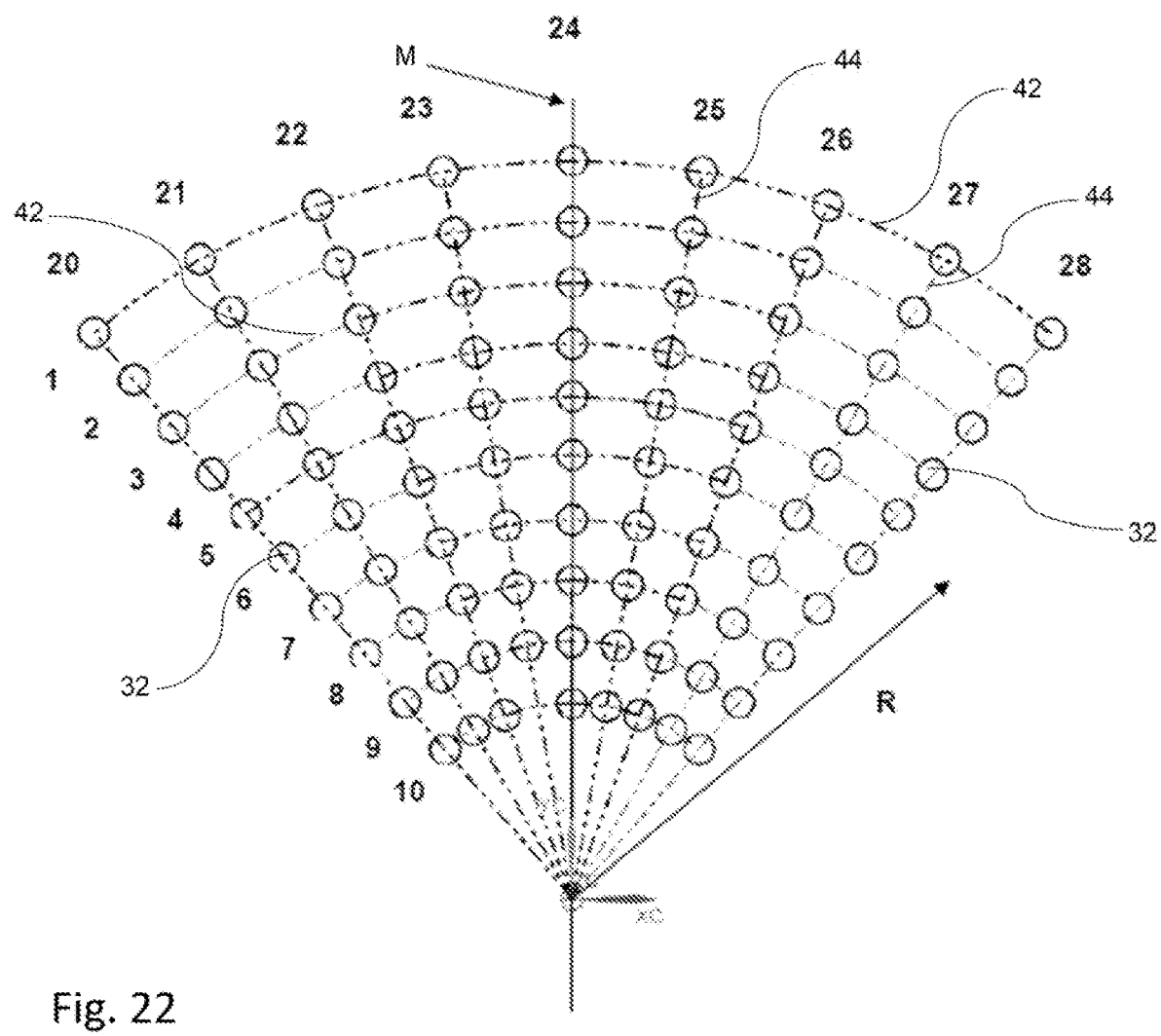
FIG. 22 shows a further exemplary hole pattern of a section of the base part.
Figure 23:
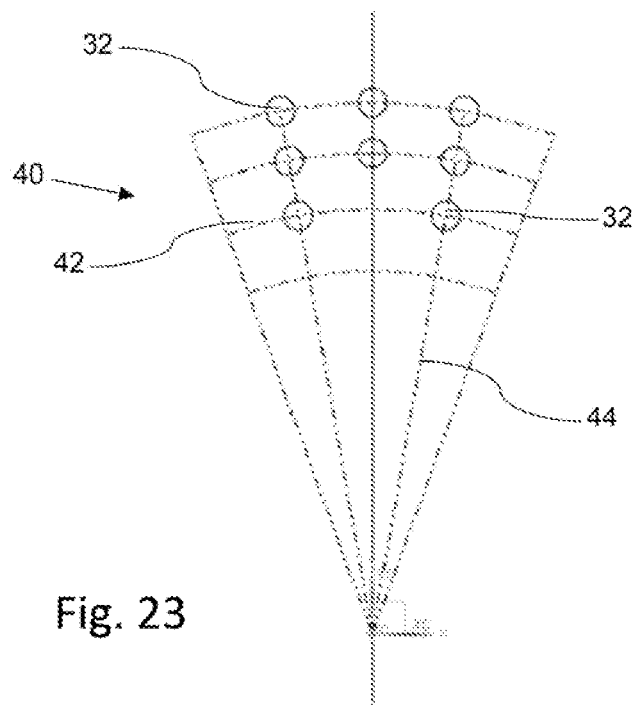
FIG. 23-26 show further exemplary hole patterns of a section of the base part.
Figure 24:
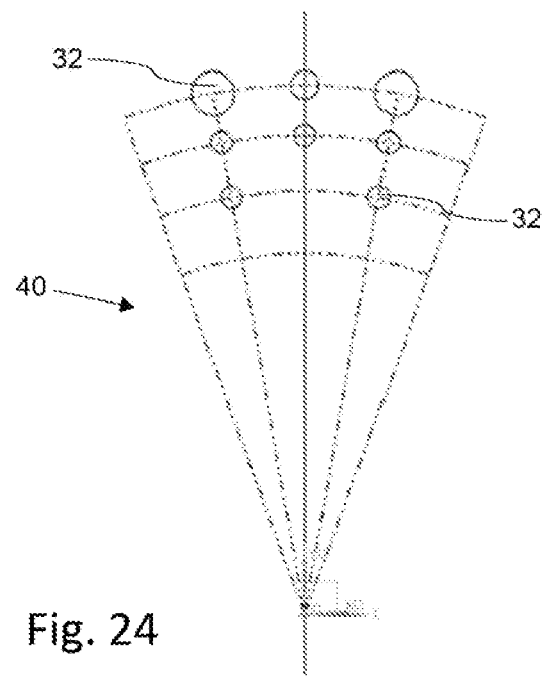
Figure 25:
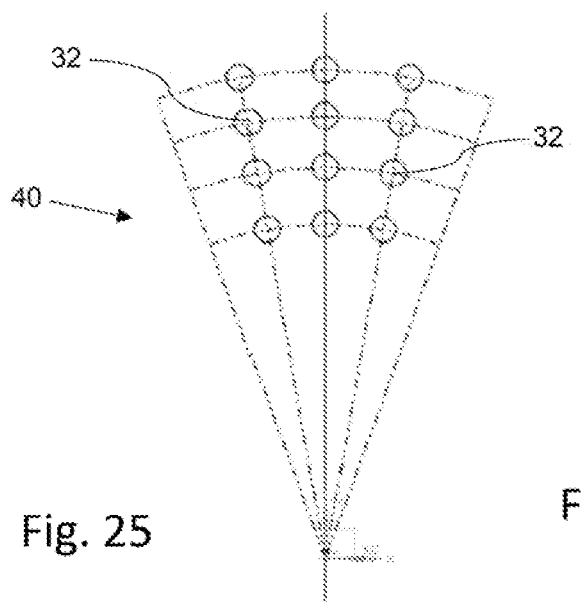
Figure 26:
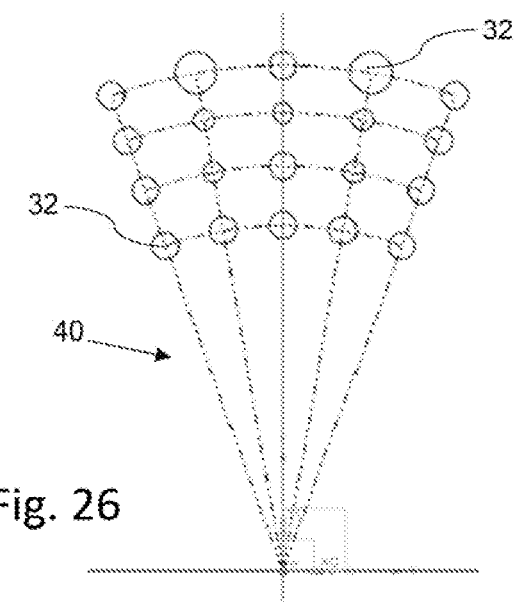

For example, the distance C: C=RAC*R
For example, the distance D: D=RAD*R
For example, the distance E: E=RAE*R FIG. 22 shows a further exemplary hole pattern 40 of a section of the base part. The individual holes 23 are here again arranged in several columns 44 and rows 42, wherein the columns 44 being marked with the numbers 20-28 and the rows with the numbers 1-10. The columns 44 are thereby preferably arranged in radial direction to a centre point M of the base part and the rows 42 in circumferential direction of the base part. The individual holes 32 within a hole pattern 40 may preferably have the same diameter or a different diameter. The holes 32, if different in size, are preferably in a ratio BD to each other which is between 0.25 and 10, preferably between 0.5 and 6.

FIGS. 23-26 show further exemplary hole patterns 40 of a section of the base part. Again, a plurality of holes 32 are arranged in several columns 44 and rows 42. The respective hole pattern 40 can consist of any number of holes 32, which have either the same or different diameters.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS 1 blow mould
2, 4 side parts
6 base part
6a-6e sections of the base part
10 plastic preforms
12, 14 support shells
18 cavity
20 plastic containers
22, 24 blow mould carrier
30 openings
32 hole, bore
33 slot
34 series
35 outer surface
36 channel
38 spline
40 hole pattern
42 lines
44 columns
50 forming device
52 forming station
54 rotatable carrier
55 feed device
57 discharge starwheel
60 vacuum generation device
A angle
B angle
C distance
D distance
E distance
M centre point
R radius

The invention claimed is:

1. A blow mould for forming plastic preforms into plastic containers, having at least two blow mould side parts and a base part, which form a cavity, within which plastic preforms can be formed into the plastic containers by being acted upon by a flowable medium, wherein an inner wall of the blow mould side parts and of the base part which delimits the cavity has a contour which produces a predetermined shape of the plastic containers to be produced, wherein a plurality of openings being provided in at least one section of the base part, which openings allow a gaseous medium to be discharged during an expansion process of the plastic container, and
wherein
a ratio between a surface area of the base part and a surface area of the openings is 35-175, and the ratio depends on the size of the bottle and the shape of the openings.

2. The blow mould according to claim 1,
wherein
a diameter of the base part is between 50 mm and 200 mm, and the surface area of the openings is between 23 mm² and 500 mm².

3. The blow mould according to claim 1,
wherein
the surface area of the base part is between 3900 mm² and 65000 mm², and the surface area of the openings is between 23 mm² and 500 mm².

4. The blow mould according to claim 1,
wherein
the openings are a plurality of holes and/or slots arranged in the base part.

5. The blow mould according to claim 4,
wherein
at least one hole has a diameter which is between 0.5 mm and 4 mm.

6. The blow mould according to claim 4,
wherein
at least one slot has a width which is between 0.4 mm and 2 mm.

7. The blow mould according to claim 1,
wherein
the base part is designed to form standing feet of the plastic container, wherein each standing foot having a plurality of openings.

8. The blow mould according to claim 7,
wherein
each standing foot has 7-35 openings.

9. A base part for a blow mould for forming plastic preforms into plastic containers according to claim 1, wherein the base part has an inner wall with a contour which produces a predetermined bottom shape of the plastic containers to be produced, wherein in at least one section of the base part a plurality of openings is provided which allow a gaseous medium to be discharged during an expansion process of the plastic container, and
wherein
a ratio between a surface area of the base part and a surface area of the openings is 35-175.

10. The base part according to claim 9,
wherein
a diameter of the base part is between 50 mm and 200 mm and the surface area of the openings is between 23 mm² and 500 mm².

11. The base part according to claim 9,
wherein
the surface area of the base part is between 3900 mm² and 65000 mm², and the surface area of the openings is between 23 mm² and 500 mm².

12. The base part according to claim 9,
wherein
the openings are a plurality of holes and/or slots arranged in the base part.

13. The base part according to claim 12,
wherein
at least one hole has a diameter which is between 0.5 mm and 4 mm.

14. The base part according to claim 12,
wherein
at least one slot has a width which is between 0.4 mm and 2 mm.

15. The base part according to claim 9,
wherein
the base part is designed to form standing feet of the plastic container, wherein each standing foot having a plurality of openings.

16. The base part according to claim 15,
wherein
each standing foot has 7-35 openings.

17. The base part according to claim 1,
wherein
a plurality of holes are arranged along a row.

18. The base part according to claim 1,
wherein
a combination of holes and slots is arranged in the base part, wherein the holes are preferably formed at the ends of the slots.

19. The base part according to claim 18,
wherein
a slot runs from hole to hole.

* * * * *